Figure 1:
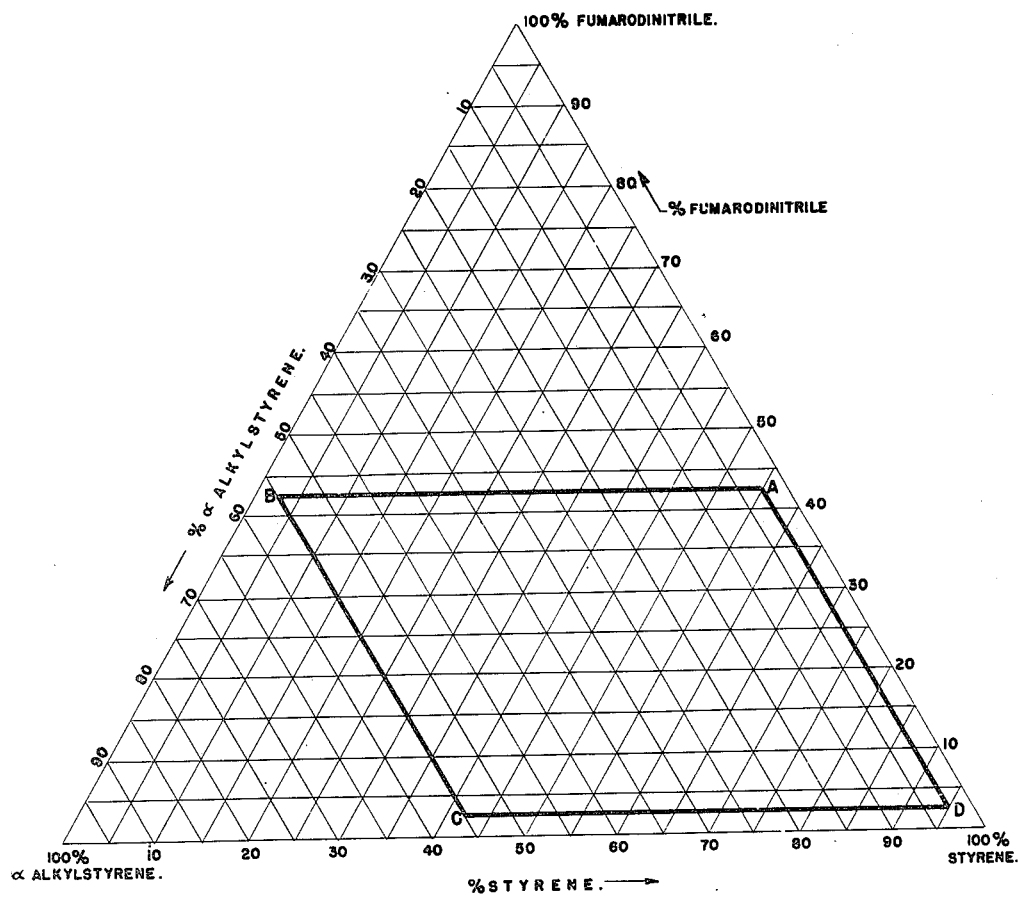

Nov. 30, 1948.  R. B. SEYMOUR  2,455,342
COPOLYMERS OF FUMARODINITRILE AND STYRENES
Filed Dec. 9, 1947  2 Sheets-Sheet 1

FIG. I.

INVENTOR.
RAYMOND B. SEYMOUR.
BY Herman O. Bauermeister
Atty.

Patented Nov. 30, 1948

2,455,342

UNITED STATES PATENT OFFICE 2,455,342

COPOLYMERS OF FUMARODINITRILE AND STYRENES

Raymond B. Seymour, Chattanooga, Tenn., assignor to Monsanto Chemical Company, St. Louis Mo., a corporation of Delaware Application December 9, 1947, Serial No. 790,681

12 Claims. (Cl. 260—78.5)

The present invention relates to polymers of fumarodinitrile, more particularly to ternary copolymers of fumarodinitrile with certain styrene compounds, and to a method of preparing the same.

An object of the present invention is to provide for the plastics and coating industries new, resinous products possessing a high degree of thermal stability and resistance to solvents. It is also an object to achieve high dielectric strength in such plastics, which, in combining good dielectric properties plus thermal stability against decomposition are particularly suitable in high frequency installations as well as for conventional radio equipment.

It is another object of the invention to provide copolymeric compositions in a particular range of formulations in which it has been impossible heretofore to manufacture satisfactory plastics.

I have found that valuable ternary copolymerization products may be obtained by polymerizing fumarodinitrile in combination with styrene and an alpha-alkyl or alpha-aryl substituted vinyl aromatic compound having the general formula $$Ar.CX:CH_2$$

Here Ar stands for a substituted or unsubstituted aromatic hydrocarbon radical such as phenyl, naphthyl, xenyl, etc., and X stands for an alkyl radical of from 1 to 5 carbon atoms, a phenyl radical or a phenyl radical containing 1 or more alkyl radicals of from 1 to 5 carbon atoms substituted in the nucleus. As examples of alpha-alkyl or alpha-aryl substituted vinyl aromatic compounds having the above general formula may be mentioned: alpha-methylstyrene, alpha-phenylstyrene, alpha-tolylstyrene, alpha-xylylstyrene, alpha-(4-ethylphenyl)styrene, 1-(alpha-methyl)vinylnaphthalene, 2-(alpha-ethyl)vinylnaphthalene, 4-(alpha-methyl)vinylbiphenyl, alpha-methyl-para-ethyl-styrene, alpha,para-dimethylstyrene, alpha-methyl-para-chlorostyrene, alpha-ethyl-para-fluorostyrene, alpha-isopropyl-para-chlorostyrene, alpha-amyl-para-chlorostyrene, alpha-methyl-ortho-bromostyrene, alpha-methyl-meta-fluorostyrene, alpha-ethyl-ortho-cyanostyrene, alpha-ethyl-meta-aminostyrene, alpha-methyl-para-iodostyrene, alpha,ortho-dimethylstyrene, alpha,ortho-diethylstyrene, alpha,ortho-di-isopropylstyrene, alpha,ortho-di-isobutylstyrene, alpha,ortho-di-tert.-amylstyrene, alpha,meta-dimethylstyrene, alpha,meta-diethylstyrene, alpha,meta-di-isopropylstyrene, alpha,meta-di-tert.-butylstyrene, alpha,meta-di-isoamylstyrene, alpha-n-propyl-para-isopropylstyrene, alpha-ethylstyrene, alpha-n-propylstyrene, alpha-isopropylstyrene, alpha-n-butylstyrene, alpha-isobutylstyrene, alpha-tert.-butylstyrene, alpha-n-amylstyrene, alpha-iso-amylstyrene, alpha-tert.-amylstyrene, etc.

It has been found that particularly valuable copolymerization products may be obtained by carrying out the invention by polymerizing fumarodinitrile and styrene in combination with alpha-methylstyrene or para-alpha-dimethylstyrene.

While it is known that vinyl aromatic compounds such as styrene or certain nuclearly substituted styrenes readily undergo polymerization alone to give resins, the particular alpha-methylstyrene and the alpha,para-dimethylstyrene compounds employed in the present invention do not polymerize per se when subjected to ordinary free radical polymerization conditions. While some polymerization of alpha-methylstyrene has been previously effected by the use of acidic catalysts, the polymers thereby obtained are unsuitable for the preparation of molded products. Polymerization of the particular alpha-alkylstyrenes would not be possible by the use of the more conventional polymerization initiators such as light, heat or peroxide catalysts.

It is also known that resinous products may be obtained by polymerizing certain difficultly reactive materials by copolymerization with acrylonitrile, as disclosed in U. S. Patent No. 2,310,961 to Edward L. Kropa. A vinyl compound like acrylonitrile may polymerize alone, however, so that it is not surprising that resinous products are obtained from a monomeric mixture consisting solely of acrylonitrile and alpha, para-dimethylstyrene. On the other hand, neither fumarodinitrile nor the alpha-alkyl-substituted styrenes of the invention undergo polymerization or auto-condensation when subjected alone to ordinary polymerizing conditions.

I have now made the surprising discovery that in the ternary system of the invention, comparatively stable fumarodinitrile and the likewise stable alpha-methylstyrene readily copolymerize. The alpha,para-dimethylstyrene also functions in this relationship. The products thus obtained are uniform, clear, hard resins possessing valuable properties. The interpolymerization products so obtained are nitrogen-containing materials which are characteristically hard masses possessing high strength properties together with high dielectric values. The color of such polymers may be clear to slightly yellow, depending upon the specific conditions of polymerization.

The present copolymers are particularly suitable for thermoplastic molding, and when subjected to heat and pressure as by molding or extruding while in a plastic condition are admirably suited for obtaining molded bodies which are characterized by high thermal stability, excellent mechanical properties and good solvent resistance. The molded bodies are light-fast and possess a glass-like transparency and are also substantially unaffected by immersion in water for long periods of time. In addition, such insolubility and thermal stability is shown in tests in which the plastic bodies are immersed in boiling water, as in the sterilization of instruments molded from such materials, without the physical dimensions of such objects being altered. Molded bodies made from the polymers of the invention also have good electrical properties and may therefore be employed for various electrical fixtures. Injection molding may also be employed with the new ternary polymers.

Cast products may be obtained by copolymerization of fumarodinitrile and styrene with the present alpha-alkylstyrenes. Cast polymers may be formed by first initiating polymerization to obtain a viscous syrup which may be poured to obtain sheets, locks, or tubes. Furthermore, the polymerization may be continued after the pouring of such syrup to obtain rigid masses possessing the desirable properties mentioned above. Cast forms of the present copolymers are advantageously employed as electrical insulating materials.

The present copolymers dissolved in suitable solvents in the presence or absence of plasticizers may be used as lacquers or for the casting of films by the conventional methods.

Solutions of the terpolymers of the invention may also be used for coating compositions, in which the high dielectric strength of such polymers is of special value.

It has been discovered that not all compositions corresponding to the various possible ratios of these individual constituents are suitable for polymerization, but that only a certain particular range of compositions provide the desired effects of heat stability, concomitant with electrical strength and resistance to the usual solvents.

In general, copolymerization of the alpha-substituted styrene with fumarodinitrile and styrene requires that 2.5 weight per cent to no more than 40 weight per cent of the fumarodinitrile be employed in the initial mixture of the monomers. However, a preferred embodiment is to employ 2.5% to 30% fumarodinitrile in such compositions. It has been found that the range of compositions in which satisfactory products may be obtained from such ternary systems requires 2.5% or more of each of the styrene, fumarodinitrile, and of the alpha-alkylstyrene, respectively. Thus, the ranges of ingredients which have been found satisfactory in the present invention are shown graphically in Fig. 1 of the drawing accompanying the present specification, in which the polygon ABCD, defined by the solid lines AB, BC, CD and DA, refers to the broad range in which it has been discovered that the desirable physical properties are obtained with the alpha-alkystyrenes, namely, alpha-methylstyrene and alpha,para-dimethylstyrene. A preferred range which may be employed in carrying out the present invention is shown in Fig. 2 as the polygon PQRS, defined by the solid lines PQ, QR, RS and SP, corresponding to the same ingredients of the terpolymer.

In general, copolymerization within the limited area of the ternary system results in the production of polymerization products possessing an impact resistance and flexural strength which exceeds that of polystyrene or of copolymers of styrene. The heat distortion point of the present copolymers greatly exceeds that of polystyrene. The electrical properties also show very good dielectric strength.

For the preparation of clear, transparent products, it is preferred to employ the fumarodinitrile in the range of 2.5% to 40 weight per cent, although the preferred range of compositions is from 2.5% to 30% of the nitrile. Generally, the use of less than 2.5% of fumarodinitrile results in the production of turbid or opaque interpolymerization products. It has been found that in compositions containing more than 2.5% fumarodintrile the opacity may be eliminated by means of the incorporation into the monomeric mixture of the other components of the ternary system: styrene and the alpha-alyklstyrene, e. g., alpha-methylstyrene or alpha-para-dimethylstyrene. Less than 2.5% of any one constituent of the ternary system is undesirable, since the desirable properties have been found not to be achievable with lesser amounts. The interrelationship of such additional materials with the fumarodinitrile is comprehended within the range established in the figure ABCD of Fig. 1. It is within this range that a realization of both the heat resisting properties and the desirable mechanical properties for the production of plastics articles is achieved.

As will be hereinafter disclosed, the copolymerization of alpha-methylstyrene with the present unsaturated nitrile, together with styrene may be effected by a variety of polymerization procedures known to those skilled in the art. Polymerization may be effected in mass, in aqueous emulsion or suspension, or in a solvent medium such as 1,4-dioxane, either in the presence or absence of a polymerizing catalyst. During or prior to the polymerization there may be added to the polymerizing mixture or to the initial mixture of monomers such conventional materials as plasticizers, colors, fillers, etc.

The invention is further illustrated, but not limited, by the following examples:

EXAMPLE 1

A mixture consisting of 35 parts by weight of alpha,para-dimethylstyrene, 35 parts of styrene and 30 parts of fumarodinitrile was polymerized in a sealed flask without a catalyst for 6 days at a temperature of 70° C. and then for 6 days at a temperature of 100° C. The resulting product was a hard, water-clear resin having a softening point of 225° C. and a melting point of over 265° C. It was soluble in acetone, but insoluble in all the other types of usual organic solvents. Because of its high softening point and solvent-resistance, it is of value in acetone solution, either in the presence or absence of plasticizers, for the production of cast films or as a resinous base for lacquers.

EXAMPLE 2

An emulsion polymerization method was employed to prepare a polymer from 95% styrene, 2.5% alpha-methylstyrene and 2.5% fumarodinitrile. A bath of water and an emulsification agent, 0.5% of Aerosol OT (the sodium salt of dioctyl sulfo-succinic acid) were brought up to the reaction temperature at about 90° C. A stream of the premixed 3-components was then charged into the emulsion by drop-wise addition.

The total time required for the monomer addition was 3½ hours. During the polymerization, the catalyst, 0.2% of potassium persulfate (based upon monomer weight), was added in small portions as a 1% aqueous solution. It was found that polymerization could be effected over a wide range of temperatures.

The final polymer emulsion was precipitated by freezing and the finely divided polymer was washed with water and ethanol. It was found by analysis that 99.8% of the initial monomer charge reacted to form the final polymer, indicating substantially complete reaction of the monomers to the ternary polymeric system.

EXAMPLE 3

When a mixture consisting of 25 parts of alpha-methylstyrene, 30 parts of fumarodinitrile and 45 parts of styrene was submitted to emulsion polymerization by the process described in Example 2, there was obtained a substantially quantitative yield of a hard, powdery copolymer having a softening point of 225° C. and soluble in acetone, but insoluble in other types of common solvents.

EXAMPLE 4

Fifty-seven per cent of styrene was employed, together with 5% fumarodinitrile and 38% of alpha-methylstyrene, in an emulsion polymerization. The mixture of monomers was added slowly to the heated solution of the sodium salt of dioctyl sulfo-succinic acid (Aerosol OT) in water. The preliminary emulsion before addition of the monomers employed 0.5% of the emulsifying agent, based on the weight of monomer to be charged, and the final emulsion concentration was in the ratio of 2:1 for the water to monomer ratio.

The resulting emulsion was precipitated by freezing and the finely divided polymer was washed with water and ethanol. The polymers thus obtained were dried in a circulating air oven at 60° C.

The final polymer was found to have a heat distortion point as measured by the ASTM method of 124° C. as contrasted to the heat distortion point of polystyrene, which varies from 86° C. to 100° C., depending upon the polymerization method employed. Further physical tests were also carried out with the polymers of this example; the data on these physical tests are summarized in the table below.

EXAMPLE 5

The adaptation of the mass polymerization method was shown in this example. The charge consisted of 38.5 weight per cent styrene, 31.5% alpha-methylstyrene and 30% fumarodinitrile. No catalyst was used in the mass polymerization. The above mixture was placed in a flask and kept in such sealed vessel in an oven. After seven days of polymerization the terpolymer was removed from the bottle and was found to be readily adaptable as a molding material. The physical properties of the polymer are shown in the table below.

The copolymerization of fumarodinitrile with the combination of styrene and alpha-methylstyrene results in the production of hard, transparent, resinous products having good mechanical and thermal properties. For example, the physical properties characteristic of certain of the above compositions are set out in the table below.

Table 1

| Terpolymer | Ex. 5 | Ex. 4 | Ex. 2 |
|---|---|---|---|
| Method of preparation | Mass | Emulsion | Emulsion |
| Charge content, wt. percent: | | | |
| Styrene | 38.5 | 57.0 | 95.0 |
| α-Methylstyrene | 31.5 | 38.0 | 2.5 |
| Fumarodinitrile | 30.0 | 5.0 | 2.5 |
| Heat Distortion Point (ASTM) | 140° C | 124° C | 105° C |
| Softening Point | 140 | 150 | 125 |
| Tensile Strength | | 4,100 p. s. i | 7,100 |
| Flexural Strength | | 14,500 p. s. i | 15,100 |
| Impact (Izod, Unnotched) | 0.9 ft. lb./in. | 2.2 | 2.3 |

It may be seen from the data of Table I summarizing the physical properties of the terpolymers of the above examples, that new and unusually strong compositions have been prepared. In particular, the heat distortion point is outstanding in these styrene-containing terpolymers. Thus, it is easily possible with the above compositions to subject parts and equipment made from such plastics to the action of boiling water as in sterilization. Higher temperature applications are also possible in other usages, since it is found that the dimensional stability of the formed objects employing the present plastics is unimpaired by the higher temperatures.

Figure 2:
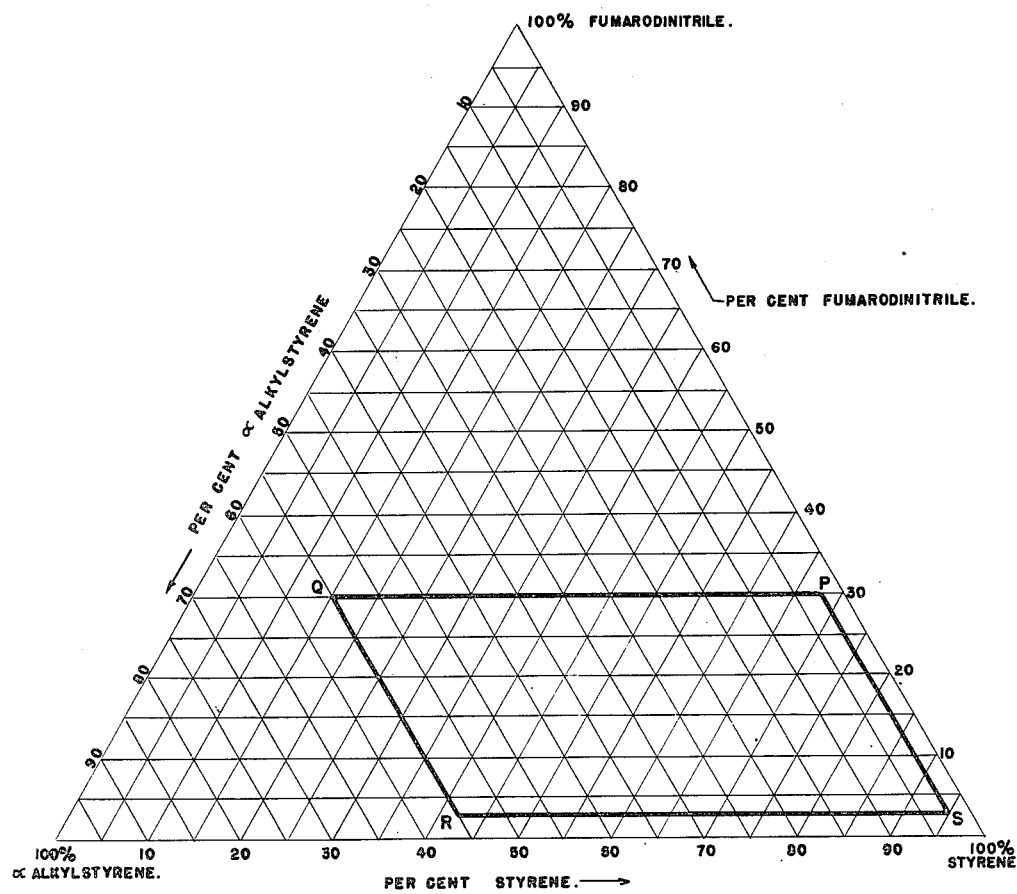

It was found that in the limited ranges set out above and shown graphically in Figs. 1 and 2 by means of the polygons enclosing the disclosed ranges of the terpolymer system, that alpha-methylstyrene and alpha,para-dimethylstyrene were similar in their action in the tertiary system. Consequently, the particular proportions which have been discovered are applicable to each of these monomers as a constituent of the ternary system. The physical properties of the final polymers are also similar for these two materials in their action in solubilizing and clarifying the system with styrene and fumarodinitrile, concomitant with the achievement of the desirably high heat distortion points and physical strength of the final polymers.

The new copolymers of the invention may be further modified in their physical properties and general appearance and utility by incorporating therein various additives such as coloring agents, fillers and plasticizers. Such materials may be added in any expedient manner before or after copolymerization, depending upon the effect such materials may have on the polymerizing rate of the monomers or on the properties desired in the finished copolymers.

Other modes of applying the principles of this invention may be employed instead of those explained, change being made as regards the polymerization process, the temperatures, reaction media and the proportion of monomeric reactants employed, provided said reactants comprise a mixture of fumarodinitrile and stryene, together with an alpha-alkylstryene in presence or absence of modifiers, other materials which are polymerizable, etc.

The present application is a continuation-in-part of the copending application, Serial No. 520,920, filed on February 3, 1944, now Patent No. 2,439,226.

What is claimed, and is desired to be secured by Letters Patent of the United States is:

1. A solid, resinous material formed by heating a mixture consisting of fumarodinitrile, alpha-methylstyrene and styrene in the relative proportions such that the three ingredients lie within the area defined approximately in the accompanying Fig. 1 by the solid lines AB, BC, CD, and DA.

2. The process for producing a solid, resinous material which comprises heating a mixture in which the relative proportions of fumarodinitrile, alpha-methylstyrene and styrene lie within the area defined approximately in the accompanying Fig. 1 by the solid lines AB, BC, CD, and DA.

3. A solid, resinous material formed by heating a mixture consisting of fumarodinitrile, alpha,-para-dimethylstyrene and styrene in the relative proportions such that the three components lie within the area defined approximately in the accompanying Fig. 1 by the solid lines AB, BC, DC, and DA.

4. The process for producing a solid, resinous material which comprises heating a mixture in which the relative proportions of fumarodinitrile, alpha,para-dimethylstyrene and styrene lie within the area defined approximately in the accompanying Fig. 1 by the solid lines AB, BC, CD, and DA.

5. A solid, resinous material formed by heating a mixture consisting of fumarodinitrile, styrene and an alpha-alkylstyrene of the group consisting of alpha-methylstyrene and alpha,para-dimethylstyrene in the relative proportions such that the three components lie within the area defined approximately in the accompanying Fig. 1 by the solid lines AB, BC, CD, and DA.

6. The process for producing a solid, resinous material which comprises heating a mixture in which the relative proportions of fumarodinitrile, styrene and an alpha-alkylstyrene of the group consisting of alpha-methylstyrene and alpha,-para-dimethylstyrene lie within the area defined approximately in the accompanying Fig. 1 by the solid lines AB, BC, CD, and DA.

7. A solid, resinous material formed by heating a mixture consisting of fumarodinitrile, alpha-methylstyrene and styrene in the relative proportions such that the three ingredients lie within the area defined approximately in the accompanying Fig. 2 by the solid lines PQ, QR, RS, and SP.

8. The process for producing a solid, resinous material which comprises heating a mixture in which the relative proportions of fumarodinitrile, alpha-methylstyrene and styrene lie within the area defined approximately in the accompanying Fig. 2 by the solid lines PQ, QR, RS and SP.

9. A solid, resinous material formed by heating a mixture consisting of fumarodinitrile, alpha,-para-dimethylstyrene and styrene in the relative proportions such that the three components lie within the area defined approximately in the accompanying Fig. 2 by the solid lines PQ, QR, RS, and SP.

10. The process for producing a solid, resinous material which comprises heating a mixture in which the relative proportions of fumarodinitrile, alpha,para-dimethylstyrene and styrene lie within the area defined approximately in the accompanying Fig. 2 by the solid lines PQ, QR, RS, and SP.

11. A solid, resinous material formed by heating a mixture consisting of fumarodinitrile, styrene and an alpha-alkylstyrene of the group consisting of alpha-methylstyrene and alpha,-para-dimethylstyrene in the relative proportions such that the three components lie within the area defined approximately in the accompanying Fig. 2 by the solid lines PQ, QR, RS, and SP.

12. The process for producing a solid, resinous material which comprises heating a mixture in which the relative proportions of fumarodinitrile, styrene and an alpha-alkylstyrene of the group consisting of alpha-methylstyrene and alpha,-para-dimethylstyrene lie within the area defined approximately in the accompanying Fig. 2 by the solid lines PQ, QR, RS, and SP.

RAYMOND B. SEYMOUR.

No references cited.